(12) United States Patent
Green et al.

(10) Patent No.: US 10,189,939 B2
(45) Date of Patent: Jan. 29, 2019

(54) HIGH PERFORMANCE EXTENDED POT LIFE EPOXY HARDENERS

(71) Applicant: ANGUS Chemical Company, Buffalo Grove, IL (US)

(72) Inventors: George D. Green, Cary, IL (US); Raymond J. Swedo, Mount Prospect, IL (US)

(73) Assignee: ANGUS CHEMICAL COMPANY, Buffalo Grove, IL (US)

( * ) Notice: Subject to any disclaimer, the term of this patent is extended or adjusted under 35 U.S.C. 154(b) by 97 days.

(21) Appl. No.: 14/910,144

(22) PCT Filed: Aug. 5, 2014

(86) PCT No.: PCT/US2014/049695
§ 371 (c)(1),
(2) Date: Feb. 4, 2016

(87) PCT Pub. No.: WO2015/021001
PCT Pub. Date: Feb. 12, 2015

(65) Prior Publication Data
US 2016/0159970 A1    Jun. 9, 2016

Related U.S. Application Data

(60) Provisional application No. 61/863,652, filed on Aug. 8, 2013.

(51) Int. Cl.
*C08G 59/50* (2006.01)
*C08L 63/00* (2006.01)

(52) U.S. Cl.
CPC ......... *C08G 59/502* (2013.01); *C08G 59/504* (2013.01); *C08G 59/5013* (2013.01); *C08G 59/5026* (2013.01)

(58) Field of Classification Search
None
See application file for complete search history.

(56) References Cited

U.S. PATENT DOCUMENTS

| | | |
|---|---|---|
| 2,816,926 A | 12/1957 | Smiley |
| 4,293,682 A | 10/1981 | Kluger et al. |
| 4,698,446 A | 10/1987 | Lai et al. |
| 4,698,466 A * | 10/1987 | Beck ............... H01H 3/166 200/302.2 |
| 5,153,296 A * | 10/1992 | Gras ............... C08G 18/10 524/102 |
| 2008/0114094 A1 | 5/2008 | Shah et al. |
| 2012/0035298 A1* | 2/2012 | Tomlinson ........... C07C 215/14 523/400 |
| 2012/0196963 A1 | 8/2012 | Swedo |
| 2014/0107313 A1 | 4/2014 | Burckhardt et al. |

FOREIGN PATENT DOCUMENTS

| | | | |
|---|---|---|---|
| JP | 2008-169376 | 7/2008 | |
| JP | 2012-525401 A1 | 10/2012 | |
| WO | WO-2011/044472 | 4/2011 | |
| WO | WO 2011044472 A1 * | 4/2011 | ........... C07C 209/34 |

OTHER PUBLICATIONS

International Preliminary Report on Patentability for PCT/US2014/049695, dated Feb. 9, 2016.
International Search Report and Written Opinion for PCT/US2014/049695, dated Nov. 6, 2014.
Notice of Reasons for Rejection issued on Japanese Application 2016-533369, dated Mar. 12, 2018.
Decision to grant issued for JP 2016-533369, dated Jul. 25, 2018 (no English translation).

* cited by examiner

*Primary Examiner* — Randy P Gulakowski
*Assistant Examiner* — Ha S Nguyen
(74) *Attorney, Agent, or Firm* — Foley & Lardner LLP

(57) ABSTRACT

A method for curing an epoxy resin by adding to the epoxy resin a compound having formula (I) wherein X is a difunctional group selected from the group consisting of $C_2$-$C_{20}$ alkyl, $C_5$-$C_{20}$ cycloalkyl, $C_6$-$C_{10}$ aryl, $C_8$-$C_{20}$ aryl alkyl, $C_4$-$C_{20}$ heteroalkyl or $C_{10}$-$C_{20}$ aryl heteroalkyl.

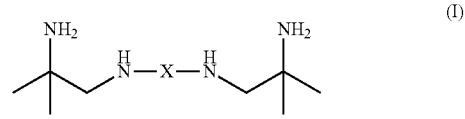

17 Claims, No Drawings

HIGH PERFORMANCE EXTENDED POT LIFE EPOXY HARDENERS

CROSS-REFERENCE TO RELATED APPLICATIONS

This application is a 371 National Phase Application of PCT/US2014/049695, filed Aug. 5, 2014, which claims benefit of U.S. Provisional Application Ser. No. 61/863,652, filed Aug. 8, 2013, the disclosures of which are incorporated herein by reference in their entireties.

BACKGROUND

This invention relates generally to a polyamine compound useful in epoxy-based coating compositions and thermosetting composites.

Typically, formulating epoxy resins with highly functional curing agents (hardeners) leads to short working lives, high formulation viscosity and brittle parts after curing. These negative effects are all driven by the high functionality of the curing agent. It is well known that in step growth polymerization, the degree of polymerization, $X_n$, and the critical extent of reaction (gel point–$p_c$) are directly linked to the functionality of the polymerizing system: $X_n=2/(2-pf_{avg})$ where p is the extent of reaction and $f_{avg}$ is the average functionality and $p_c=2/f_{avg}$. Thus systems with a high average functionality will reach high molecular weights and gel at a lower degree of polymerization than those with a low average functionality. U.S. Pat. No. 4,293,682 discloses use of tetra- and penta-functional amines as curing agents.

While low functionality curing agents will provide longer pot lives, these lead to final cured networks with low crosslink densities and poor thermal and mechanical properties. This inverse relationship between highly functional monomers needed for final part properties and low functionality monomers for enhanced working time requires a compromise in formulating epoxies. Anything that can be done to enhance working time without adversely affecting the final part properties would be advantageous.

STATEMENT OF INVENTION

The present invention is directed to a method for curing an epoxy resin by adding to the epoxy resin a curing agent comprising a compound having formula (I)

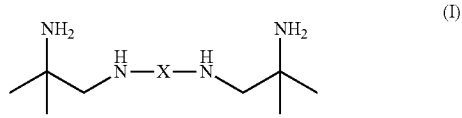

(I)

wherein X is a difunctional group selected from the group consisting of $C_2$-$C_{20}$ alkyl, $C_5$-$C_{20}$ cycloalkyl, $C_6$-$C_{10}$ aryl, $C_8$-$C_{20}$ aryl alkyl, $C_4$-$C_{20}$ heteroalkyl or $C_{10}$-$C_{20}$ aryl heteroalkyl.

DETAILED DESCRIPTION

All percentages are weight percentages ("wt %") and temperatures in ° C., unless otherwise indicated. Concentrations in parts per million ("ppm") are calculated on a weight/volume basis. An "alkyl" group is a hydrocarbon substituent group having from one to twenty carbon atoms, unless otherwise specified, in a linear or branched arrangement. Alkyl groups optionally have one or more double or triple bonds. Substitution on alkyl groups of one or more hydroxy or alkoxy groups is permitted. Preferably, alkyl groups are saturated and unsubstituted. A "cycloalkyl" group is an alkyl group containing at least one saturated ring. A "heteroalkyl" group is an alkyl group in which at least one carbon has been replaced by O, NR, or S, wherein R is hydrogen, alkyl, aryl or aralkyl; e.g., —CH$_2$CHR' (OCH$_2$CHR')$_n$— where R' is hydrogen, methyl or ethyl and n is from one to nine, or an upper limit determined by the maximum size of the heteroalkyl group and the identity of R'. The carbon number of a heteroalkyl group is the actual number of carbon atoms in the heteroalkyl group, and does not include incorporated heteroatoms. Preferably, a heteroalkyl group has only oxygen heteroatoms. Preferably, the ratio of carbon atoms to oxygen atoms is from 5:1 to 2:1, alternatively from 4:1 to 2.5:1. Preferably, a heteroalkyl group is attached through carbon atoms at either end of the chain. An "aryl" group is a substituent derived from an aromatic hydrocarbon compound. An aryl group has a total of from six to twenty ring atoms, unless otherwise specified, and has one or more rings which are separate or fused. An "aralkyl" group is an "alkyl" group substituted by an "aryl" group. An "aryl alkyl" group is a difunctional group in which a difunctional aryl group is inserted into an alkyl group, e.g., —(CH$_2$)$_x$C$_6$H$_4$(CH$_2$)$_y$—, where C$_6$H$_4$ is o-, m- or p-phenylene and x and y may be the same or different, preferably the same, and have values consistent with the overall size of the aryl alkyl group and the identity of the inserted aryl group. An "aryl heteroalkyl" group is a difunctional group in which a difunctional aryl group is inserted into a heteroalkyl group. Substitution on aryl groups of one or more of the following groups: halo, cyano, nitro, hydroxy, alkoxy, alkyl, heteroalkyl, alkanoyl, amino, or amino substituted by one or more of alkyl, aryl, aralkyl, heteroalkyl or alkanoyl is permitted, with substitution by one or more halo groups being possible on alkyl, heteroalkyl, alkanoyl or alkoxy groups. Preferably, aryl groups do not contain halogen atoms. In one preferred embodiment of the invention, aryl groups are unsubstituted or substituted only by alkyl groups. A difunctional group is a substituent group having two points of attachment, e.g., one example of a difunctional alkyl group would be —(CH$_2$)$_x$—, where x could be from two to twenty.

Preferably, X is a difunctional group selected from the group consisting of $C_2$-$C_{12}$ alkyl, $C_5$-$C_{10}$ cycloalkyl, $C_6$-$C_8$ aryl, $C_8$-$C_{12}$ aryl alkyl, $C_4$-$C_{20}$ heteroalkyl and $C_{10}$-$C_{20}$ aryl heteroalkyl; preferably $C_3$-$C_{10}$ alkyl and $C_4$-$C_{20}$ heteroalkyl; preferably $C_4$-$C_{10}$ alkyl and $C_6$-$C_{15}$ heteroalkyl; preferably $C_6$-$C_{15}$ heteroalkyl.

Compounds of formula (I) may be prepared by the methods disclosed in US20120196963A1.

Preferably, compound (I) is made from a diamine, H$_2$N—X—NH$_2$, consisting of polymerized units, e.g., two-six units, of alkylene oxides, e.g., ethylene oxide, propylene oxide and butylene oxide, capped with aminoalkyl groups, e.g., $C_2$-$C_4$ aminoalkyl groups. Preferably, X represents a mixture of groups having the average formula —CH(CH$_3$) CH$_2$(OCH$_2$CH(CH$_3$))$_n$—, where n is from 2 to 4, preferably about 2.7. The mixture having n=2.7 contains at least the species having n equal to 2, 3 and 4, which correspond to X being a $C_9$, $C_{12}$ or $C_{15}$ heteroalkyl group, respectively. Preferably, X is a $C_6$-$C_9$ heteroalkyl group having two oxygen atoms.

Preferably, the epoxy resin is a condensate of epichlorohydrin and a diol. Preferably, the epoxy resin is an aromatic epoxy resin, preferably a bisphenol A resin or a novolac epoxy resin, preferably a bisphenol A resin. Preferably, the epoxy resin is a condensate of an aromatic diol (e.g., bisphenol A) and epichlorohydrin. Preferably, the molecular weight of the epoxy resin is no greater than 1000, preferably no greater than 800, preferably no greater than 600, preferably no greater than 400.

The compound of formula (I) may be added to the epoxy resin as part of a mixture with other curing agents to allow fine control of cure time and cured resin properties. Preferably, the curing agent comprises at least 40 wt % of at least one compound of formula (I), preferably at least 50 wt %, preferably at least 60 wt %, preferably at least 70 wt %, preferably at least 80 wt %, preferably at least 90 wt %. Preferably, the ratio of total equivalents of NH in the curing agent to equivalents of epoxide is from 0.5:1 to 1.5:1, preferably from 0.7:1 to 1.3:1, preferably from 0.8:1 to 1.2:1, preferably from 0.9:1 to 1.1:1. The present invention is also directed to a two-component epoxy formulation in which one component comprises a curing agent comprising at least one compound of formula (I) and the other component comprises an epoxy resin.

EXAMPLES

DER-331 epoxy resin (bisphenol A-epichlorohydrin adduct), DETA and PRIMENE MD amine were obtained from the Dow Chemical Company.

Viscosity Measurements

Using the ratios given in Table 1, fifteen grams of epoxy resin/hardener mixture was prepared for each test. The formulations were prepared by mixing the amine hardener and resin thoroughly with an overhead stirrer. Each viscosity measurement series was started immediately following mixing. Viscosity measurements were performed using a Brookfield Programmable RVDV-II+Viscometer with a YDX-1/SP1-UC-Y type D spindle extension and an SC4-18/13R Spindle. Two series of measurements were run for each resin/hardener mixture, one at 25° C. and a second at 40° C. The temperature, viscosity, torque, spindle speed, and time were recorded for each series to document the change in viscosity over time. Measurements were recorded for 8 hours or until the viscosity exceeded 50000 cps.

Preparation of Molded Bars

Resin and hardener were mixed for 1 minute in a disposable cup using an overhead stirrer. The resin mixture was poured into a nine cavity (each cavity is 3"×½"×3/16") (7.6 cm×1.3 cm×4.8 mm) pre-heated (65° C.) silicone rubber mold and de-gassed in a 65° C. vacuum oven. The mold was placed in a pre-heated forced air, programmable oven and covered with an aluminum pan to minimize turbulence. The cure schedule used was 65° C./2 hours, ramp to 150° C. over 30 minutes, hold 150° C./2 hours, ramp to 200° C. over 30 minutes, hold 200° C./1 hour, then cool to 65° C. at 2° C./minute. Fluoropolymer-based mold release was used to facilitate the specimen removal from the mold. Upon de-molding, the bars had surface roughness and flashing. Each specimen was sanded to approximately 0.10 inch (2.54 mm) thickness using an orbital sander and a stainless steel part jig. Once near the desired thickness, a fine grit sandpaper was used to give the parts a smooth, scratch-free surface. This process eliminated any surface defects and gave parts with a uniform thickness.

3-Point Flex Testing

Three point flex testing was performed on an INSTRON model 5567 using Blue Hill 2 Software Version 2.24.787 according to ASTM D790-03. A 2 inch support span and a crosshead speed of 0.050 in/min was used for all measurements. Three point flex testing was replicated on six bars of each epoxy/hardener formula and the results are reported as an average value after excluding any statistically outlying data points Post Cure Differential Scanning Calorimetry (DSC) Testing DSC analyses were performed using a TA Instruments Q100 DSC. Temperature scans were run from 25° C. to 260° C. at 10° C./minute, back to 25° C. at 10° C./min followed by a re-heat scan back to 260° C. at 10° C./min. All analyses were run under a flowing nitrogen atmosphere.

Thermogravimetric Analyses (TGA)

Thermogravimetric analyses were performed using a TA Instruments Q50 TGA. The temperature was ramped from 25° C. to 400° C. at 10° C./min, then 50° C./min to 600° C. with a final hold time of 10 min. All analyses were run under a flowing air atmosphere.

Dynamic Mechanical Analyses (DMA)

Dynamic mechanical analyses were performed using a TA Instruments Q800 DMA. A 3-point flex mode was used with a span of 25 mm. Typical part dimensions were 36 mm×13 mm×2.3 mm. The instrument was run in multi-frequency—strain mode, using a preload force of 0.5N, strain of 0.1% and a frequency of 1 hz. The temperature was ramped from 25° C. to 200° C. at 3° C./min. All analyses were run under air.

EXAMPLES—RESULTS

The main focus of this work was to assess the pot life and the thermal and mechanical properties of thermoset epoxy systems cured with the hexafunctional hindered amine hardeners and their comparisons with commercially available hardeners.

Table 1 contains the amines used in this study, their functionality, amine equivalent weight and formulation ratio for mixing DER-331 assuming a ratio of 1:1 equivalents of amine:equivalents of epoxide. The structures of the amines can be seen in Structure Table 1.

TABLE 1

Amine Formulation Data

| Amine | CAS # | Funct. | AHEW | g per 1 g DER 331 |
|---|---|---|---|---|
| DETA | 111-40-0 | 5 | 20.63 | 0.11 |
| HD-bis-ACyHM | 102155-24-0 | 6 | 56.43 | 0.30 |
| JEFF D230-bis-AMP | none | 6 | 62.00 | 0.33 |
| HD-bis-AMP | 1287302-78-6 | 6 | 43.08 | 0.23 |
| EDBDA-bis-AMP | none | 6 | 48.42 | 0.26 |

Calculations Using Epoxy Equivalent Weight for DER-331=185.5

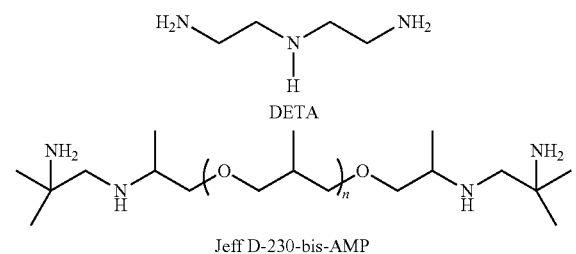

Structure TABLE 1. Polyamine Hardeners

DETA

Jeff D-230-bis-AMP

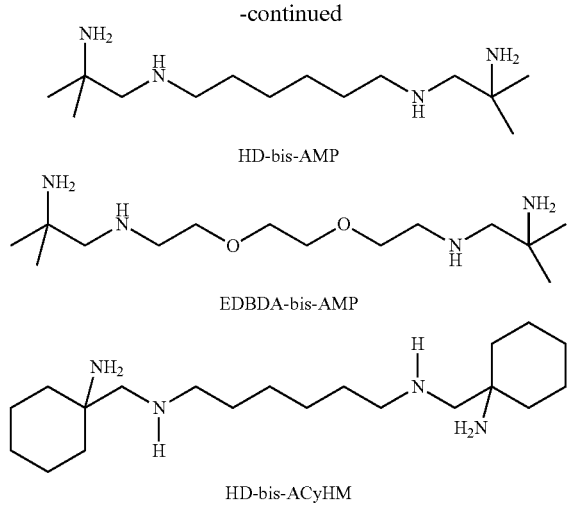

DETA is the commercially available comparative example. JeffD-230-bis-AMP (n is ca. 2.7), HD-bis-AMP and EDBDA-bis-AMP are examples of this disclosure. HD-bis-ACyHM is a comparative example from U.S. Pat. No. 2,816,926.

Formulation Viscosity as a Function of Time and Temperature

Initially, small scale formulations were prepared and their viscosities were measured as a function of time both at 25° C. and 40° C. As can be seen in the table, the initial viscosities of the comparative and inventive compositions are similar.

TABLE 2

Viscosity Build as a Function of Time and Temperature

| Amine | Initial Viscosity (cps) | | Time to 5000 cps (min) | | Time to 50,000 cps (min) | | Safety Window* (min) | |
|---|---|---|---|---|---|---|---|---|
| @ Temperature | 25° C. | 40° C. | 25° C. | 40° C. | 25° C. | 40° C. | 25° C. | 40° C. |
| DETA | 1700 | 400 | 37 | 21 | 82 | 34 | 45 | 13 |
| HD-bis-ACyHM | 2585 | 560 | 74 | 83 | 290** | 150 | 216 | 67 |
| Jeff D230-bis-AMP | 1700 | 300 | 270 | 225 | >>480 | 380 | >210 | 155 |
| HD-bis-AMP | 1750 | 400 | 135 | 115 | 380 | 180 | 265 | 65 |
| EDBDA-bis-AMP | 1530 | 355 | 205 | 170 | 460 | 255 | 255 | 85 |

*Safety Window defined as the time elapsed between exceeding the max 5000 cps working viscosity and the 50000 cps, intractable value.
**HD-bis-ACyHM time to 50,000 cps estimated from a curve fit of the 20,000 cps data In sharp contrast, the time to exceed either 5000 or 50,000 cps is significantly enhanced for the inventive compounds relative to DETA or HD-bis-ACyHM. This demonstrates the longer time to gellation for the inventive compounds despite their higher functionality.

Three Point Flex Testing

With proven advantages in formulation working life behavior, the demonstration of desirable cured resin properties becomes important. Castings were prepared by pouring resin formulations into a warm silicone rubber mold comprised of nine individual cavities, followed by vacuum degassing to remove trapped air. The mold was then placed in a forced air, programmable oven for curing; the mold was covered with a loose fitting lid to minimize turbulence. A minimum of 5 test specimens were used to generate the summary data. The reduced flex data are collected in Table 3.

TABLE 3

Summary of ASTM D-790 Flex Test Results

| Curing Agent | Flex Modulus (Mpsi) | Peak Load (lbf) | Peak Stress (ksi) | Strain @ Peak Load (%) | Strain @ Break (%) | Energy @ Break (ft-lbf) |
|---|---|---|---|---|---|---|
| DETA | 0.41 | 22.7 | 15.37 | 6.20 | 6.40 | 0.53 |
| HD-bis-AMP | 0.42 | 26.3 | 16.56 | 6.87 | 8.20 | 0.81 |
| EDBDA-bis-AMP | 0.46 | 22.3 | 16.84 | 6.42 | 8.71 | 0.88 |
| JD230-bis-AMP | 0.50 | 26.7 | 17.98 | 5.95 | 9.12 | 1.06 |
| HD-bis-ACyHM | 0.41 | 17.1 | 14.6 | 5.38 | 5.40 | 0.38 |

What is immediately apparent from the data is that the inventive curing agents have higher initial modulus relative to DETA or HD-bis-ACyHM. Also apparent is the higher peak loads for HD-bis-AMP and JD-230-bis-AMP, and higher strain at break for all 3 inventive compounds relative to DETA or HD-bis-ACyHM. Energy at break—a measure of toughness—is between 50 and 100% higher for the inventive compounds as well.

Thermal Analyses of the Cured Bars

DSC and TGA analyses were performed on portions of the cured bars used to generate the flex data. The DSC protocol used was to heat the specimen from room temperature to 260° C., cool back to room temperature and re-heat to 260° C. This re-heat cycle was implemented to demonstrate the ultimate Tg obtainable with each curing agent. While the ultimate Tg values of the inventive compounds, seen in table 4, were slightly lower than DETA all were clearly acceptable. The TGA data indicates that the inventive compounds have stability equivalent to DETA. The loss in Tg of the HD-bis-ACyHM with the re-heat cycle indicates degradation has occurred during the first heating—clearly a detriment to high temperature use.

TABLE 4

Thermal Analyses

| Curing Agent | Tg (° C.) (1st heat) | Tg (° C.) (2nd heat) | TGA (wt. loss onset, ° C.) |
|---|---|---|---|
| DETA | 132 | 133 | 339 |
| HD-bis-AMP | 90 | 127 | 324 |
| EDBDA-bis-AMP | 108 | 118 | 323 |
| JD230-bis-AMP | 118 | 120 | 328 |
| HD-bis-ACyHM | 118 | 85 | NA |

DMA Analyses

DMA analyses on the cured bars were performed. Three point bending mode with a 1 inch (2.54 cm) span was chosen for the sample geometry, and the results from a single analysis are shown. The Tg values obtained matched well with those from the DSC re-heat scans. The Storage and Loss moduli show the same trend as seen with the Instron generated data; DETA has lower storage and loss moduli as compared to the inventive compounds and HD-bis-ACyHM is substantially worse still.

TABLE 5

DMA Analyses

| Curing Agent | Storage Modulus (MPa) | Loss Modulus (MPa) | Tan δ (MPa) | Tg (° C.) |
|---|---|---|---|---|
| DETA | 12556 | 700 | 826 | 138 |
| HD-bis-AMP | 15632 | 1012 | 790 | 135 |
| EDBDA-bis-AMP | 15860 | 831 | 434 | 126 |
| JD-230-bis-AMP | 16298 | 1238 | 491 | 121 |
| HD-bis-ACyHM | 1504 | 410 | NA | 132 |

The preceding examples have clearly demonstrated the much lower reactivity, longer pot life capability of the inventive compounds while providing superior mechanical and equivalent thermal performance.

The invention claimed is:

1. A method for curing an epoxy resin; said method comprising adding to the epoxy resin a curing agent comprising a compound of formula (I)

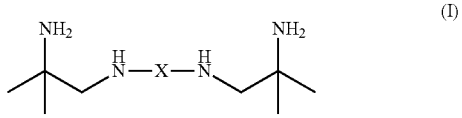

(I)

wherein:
X is a difunctional group selected from $C_3$-$C_{10}$ alkyl and $C_4$-$C_{20}$ heteroalkyl having only oxygen heteroatoms.

2. The method of claim 1 in which the epoxy resin is an aromatic epoxy resin having a molecular weight no greater than 1000.

3. The method of claim 1 in which the epoxy resin is an adduct of bisphenol A and epichlorohydrin.

4. The method of claim 1 in which a ratio of total equivalents of NH in the curing agent to equivalents of epoxide in the epoxy resin is from 0.5:1 to 1.5:1.

5. The method of claim 1 in which the curing agent comprises at least 40 wt % of at least one compound of formula (I).

6. The method of claim 1 in which X is a difunctional group selected from $C_4$-$C_{10}$ alkyl and $C_6$-$C_{15}$ heteroalkyl having only oxygen heteroatoms.

7. The method of claim 1 in which X is a mixture of difunctional groups of formula —$CH(CH_3)CH_2(OCH_2CH(CH_3))_n$—, wherein n is an average from 2 to 4.

8. The method of claim 1 in which the curing agent comprises at least 50 wt % of at least one compound of formula (I).

9. A cured epoxy resin prepared by a process comprising mixing and heating a composition comprising an epoxy resin and a curing agent,
wherein the curing agent comprises a compound of formula (I)

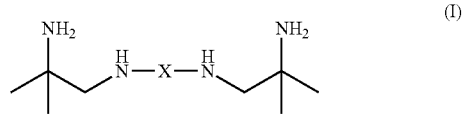

(I)

wherein:
X is a difunctional group selected from $C_3$-$C_{10}$ alkyl and $C_4$-$C_{20}$ heteroalkyl having only oxygen heteroatoms.

10. The cured epoxy resin of claim 9 in which X is selected from $C_4$-$C_{10}$ alkyl and $C_6$-$C_{15}$ heteroalkyl having only oxygen heteroatoms.

11. The cured epoxy resin of claim 9 in which X is a mixture of difunctional groups of formula —$CH(CH_3)CH_2(OCH_2CH(CH_3))_n$—, wherein n is an average from 2 to 4.

12. The cured epoxy resin of claim 9 in which the epoxy resin is an aromatic epoxy resin having a molecular weight no greater than 1000.

13. The cured epoxy resin of claim 9 in which the epoxy resin is an adduct of bisphenol A and epichlorohydrin.

14. The cured epoxy resin of claim 9 in which a ratio of total equivalents of NH in the curing agent to equivalents of epoxide in the epoxy resin is from 0.5:1 to 1.5:1.

15. The cured epoxy resin of claim 9 in which the curing agent comprises at least 40 wt % of at least one compound of formula (I).

16. The cured epoxy resin of claim 9 in which the curing agent comprises at least 50 wt % of at least one compound of formula (I).

17. A method for curing an epoxy resin; said method comprising adding to the epoxy resin a curing agent comprising a compound of formula (I)

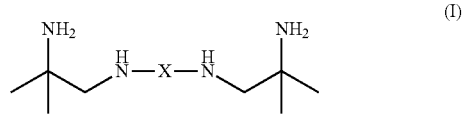

(I)

wherein:
X is a difunctional group selected from $C_4$-$C_{10}$ alkyl and $C_4$-$C_{20}$ heteroalkyl having only oxygen heteroatoms with a ratio of carbon atoms to oxygen atoms from 5:1 to 2:1; and
a ratio of total equivalents of NH in the curing agent to equivalents of epoxide in the epoxy resin is from 0.5:1 to 1.5:1.

* * * * *